(12) United States Patent
Itogawa

(10) Patent No.: US 10,225,372 B2
(45) Date of Patent: Mar. 5, 2019

(54) DEVICE MANAGEMENT APPARATUS, DEVICE MANAGEMENT SYSTEM, AND VERIFICATION METHOD

(71) Applicant: Akira Itogawa, Kanagawa (JP)

(72) Inventor: Akira Itogawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 131 days.

(21) Appl. No.: 15/361,960

(22) Filed: Nov. 28, 2016

(65) Prior Publication Data
US 2017/0171354 A1     Jun. 15, 2017

(30) Foreign Application Priority Data

Dec. 9, 2015   (JP) ................................ 2015-240253

(51) Int. Cl.
| | | |
|---|---|---|
| H04L 29/08 | (2006.01) | |
| G06F 21/57 | (2013.01) | |
| G06F 8/65 | (2018.01) | |
| H04L 29/06 | (2006.01) | |

(52) U.S. Cl.
CPC .............. *H04L 67/34* (2013.01); *G06F 21/57* (2013.01); *G06F 21/572* (2013.01); *H04L 67/10* (2013.01); *G06F 8/65* (2013.01); *G06F 21/577* (2013.01); *H04L 67/06* (2013.01); *H04L 67/42* (2013.01)

(58) Field of Classification Search
CPC ......... H04L 67/10; H04L 67/34; H04L 67/06; H04L 67/42; G06F 21/57; G06F 21/572; G06F 8/65; G06F 21/577
See application file for complete search history.

(56) References Cited

U.S. PATENT DOCUMENTS

| | | | | |
|---|---|---|---|---|
| 6,275,976 | B1 * | 8/2001 | Scandura | G06F 11/3608 714/E11.208 |
| 7,865,952 | B1 * | 1/2011 | Hopwood | G06F 8/65 726/22 |
| 8,365,138 | B2 * | 1/2013 | Iborra | G06F 8/30 717/104 |
| 9,588,756 | B2 * | 3/2017 | Liem | G06F 21/57 |
| 2003/0083942 | A1 * | 5/2003 | Mallon | G06Q 30/0225 705/14.26 |
| 2008/0229426 | A1 | 9/2008 | Saitoh | |
| 2009/0135725 | A1 * | 5/2009 | Tanaka | H04L 43/50 370/241 |

(Continued)

FOREIGN PATENT DOCUMENTS

| | | | |
|---|---|---|---|
| CN | 103685471 A | * | 3/2014 |
| JP | 2008-226160 | | 9/2008 |
| JP | 2013-145504 | | 7/2013 |

*Primary Examiner* — Oanh Duong
(74) *Attorney, Agent, or Firm* — Harness, Dickey & Pierce, P.L.C.

(57) ABSTRACT

A device management apparatus includes circuitry configured to: acquire an updating program for updating a device; transmit the updating program to the device; receive introduction success/failure information indicating whether the updating program is successfully introduced, from the device; acquire, if the introduction success/failure information indicates success in introduction, a verification program for verifying an operation of the device updated with the updating program; and verify whether the operation of the updated device can be guaranteed based on the verification program.

14 Claims, 16 Drawing Sheets

(56) References Cited

U.S. PATENT DOCUMENTS

| | | | | |
|---|---|---|---|---|
| 2010/0293530 A1* | 11/2010 | Ivancic | .............. | G06F 11/3608 |
| | | | | 717/126 |
| 2011/0176456 A1* | 7/2011 | Tamura | ................ | G06F 13/122 |
| | | | | 370/254 |
| 2012/0198514 A1* | 8/2012 | McCune | ................ | G06F 21/57 |
| | | | | 726/1 |
| 2013/0079950 A1* | 3/2013 | You, II | .................... | H04L 67/34 |
| | | | | 701/1 |
| 2014/0189336 A1* | 7/2014 | Ballesteros | ........... | G06F 21/575 |
| | | | | 713/2 |
| 2014/0215264 A1* | 7/2014 | Ono | .................... | G06F 11/2028 |
| | | | | 714/13 |
| 2016/0026459 A1* | 1/2016 | Yang | ....................... | H04L 67/06 |
| | | | | 717/171 |

* cited by examiner

FIG.5

| DEVICE ID | IP ADDRESS | DEVICE TYPE INFORMATION |
|---|---|---|
| 1 | 10.20.30.1 | |
| 2 | 10.20.30.2 | |
| 3 | 10.20.30.3 | |
| ⋮ | ⋮ | ⋮ |

FIG.6

| DEVICE ID | IP ADDRESS | DEVICE TYPE INFORMATION |
|---|---|---|
| 1 | 10.20.30.1 | A |
| 2 | 10.20.30.2 | A |
| 3 | 10.20.30.3 | A |
| ⋮ | ⋮ | ⋮ |

FIG.7

| UPDATING PROGRAM ID | UPDATING PROGRAM |
|---|---|
| 1 | Firm-AB-Ver1.51 |
| 2 | Firm-C-Ver1.52 |
| 3 | Firm-AB-Ver1.53 |
| ⋮ | ⋮ |

FIG.8

| UPDATING PROGRAM ID | DEVICE TYPE INFORMATION |
|---|---|
| 1 | A |
| 2 | B |
| 3 | C |
| ⋮ | ⋮ |

FIG.9

| UPDATING PROGRAM ID | VULNERABILITY ID |
|---|---|
| 1 | CVE-2015-1001 |
| 1 | CVE-2015-1002 |
| 3 | CVE-2015-1003 |
| ⋮ | ⋮ |

FIG.10

| VULNERABILITY ID | VERIFICATION PROGRAM |
|---|---|
| CVE-2015-1001 | Test-cve-2015-1001.exe |
| CVE-2015-1002 | Test-cve-2015-1002.exe |
| CVE-2015-1003 | Test-cve-2015-1003.exe |
| ⋮ | ⋮ |

FIG.11

| TIME INFORMATION | UPDATING PROGRAM ID | DEVICE ID | INTRODUCTION SUCCESS/ FAILURE INFORMATION | VULNERABILITY ID | VERIFICATION RESULT INFORMATION |
|---|---|---|---|---|---|
| 2015/8/27 13:00 | 1 | 1 | OK | CVE-2015-1001 | OK |
| 2015/8/27 13:03 | 1 | 1 | OK | CVE-2015-1002 | OK |
| 2015/8/27 13:07 | 1 | 2 | NG | | |
| 2015/8/27 13:08 | 1 | 3 | OK | CVE-2015-1001 | OK |
| 2015/8/27 13:10 | 1 | 3 | OK | CVE-2015-1002 | NG |

FIG.19

| TIME INFORMATION | UPDATING PROGRAM ID | DEVICE ID | INTRODUCTION SUCCESS/ FAILURE INFORMATION | VULNERABILITY ID | VERIFICATION RESULT INFORMATION |
|---|---|---|---|---|---|
| 2015/8/27 13:00 | 1 | 1 | OK | CVE-2015-1001 | OK |
| 2015/8/27 13:03 | 1 | 1 | OK | CVE-2015-1002 | OK |
| 2015/8/27 13:07 | 1 | 2 | NG | | |
| 2015/8/27 13:08 | 1 | 3 | OK | CVE-2015-1001 | OK |
| 2015/8/27 13:10 | 1 | 3 | OK | CVE-2015-1002 | NG |
| 2015/8/27 13:40 | 1 | 2 | OK | CVE-2015-1001 | OK |
| 2015/8/27 13:43 | 1 | 2 | OK | CVE-2015-1002 | OK |
| 2015/8/27 13:46 | 1 | 3 | OK | CVE-2015-1002 | OK |

DEVICE MANAGEMENT APPARATUS, DEVICE MANAGEMENT SYSTEM, AND VERIFICATION METHOD

CROSS-REFERENCE TO RELATED APPLICATIONS

The present application claims priority under 35 U.S.C. § 119 to Japanese Patent Application No. 2015-240253, filed Dec. 9, 2015. The contents of which are incorporated herein by reference in their entirety.

BACKGROUND OF THE INVENTION

1. Field of the Invention

The present invention relates to a device management apparatus, a device management system, and a verification method.

2. Description of the Related Art

Conventionally, there is known a technique of distributing an updating program from a device management apparatus that manages a device, to the device as a management target, and introducing the updating program into the device as the management target, to update a device. As such a technique, for example, Japanese Unexamined Patent Application Publication No. 2013-145504 discloses a technique of distributing firmware from a distribution apparatus to a device to be updated with the firmware.

SUMMARY OF THE INVENTION

According to one aspect of the present invention, a device management apparatus includes circuitry. The circuitry is configured to acquire an updating program for updating a device. The circuitry is further configured to transmit the updating program to the device. The circuitry is still further configured to receive introduction success/failure information indicating whether the updating program is successfully introduced, from the device. The circuitry is still further configured to acquire, if the introduction success/failure information indicates success in introduction, a verification program for verifying an operation of the device updated with the updating program. The circuitry is still further configured to verify whether the operation of the updated device can be guaranteed based on the verification program.

BRIEF DESCRIPTION OF THE DRAWINGS

FIG. 5 is a diagram illustrating an example of device information stored in a device information storage unit according to the first embodiment;

FIG. 6 is a diagram illustrating an example of the device information stored in the device information storage unit according to the first embodiment;

FIG. 7 is a diagram illustrating an example of information stored in an updating program storage unit according to the first embodiment;

FIG. 8 is a diagram illustrating an example of information stored in a target device type information storage unit according to the first embodiment;

FIG. 9 is a diagram illustrating an example of information stored in a target vulnerability information storage unit according to the first embodiment;

FIG. 10 is a diagram illustrating an example of information stored in a verification program storage unit according to the first embodiment;

FIG. 11 is a diagram illustrating an example of information stored in a result information storage unit according to the first embodiment;

FIG. 19 is a diagram illustrating an example of information stored in a result information storage unit according to a first modification;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
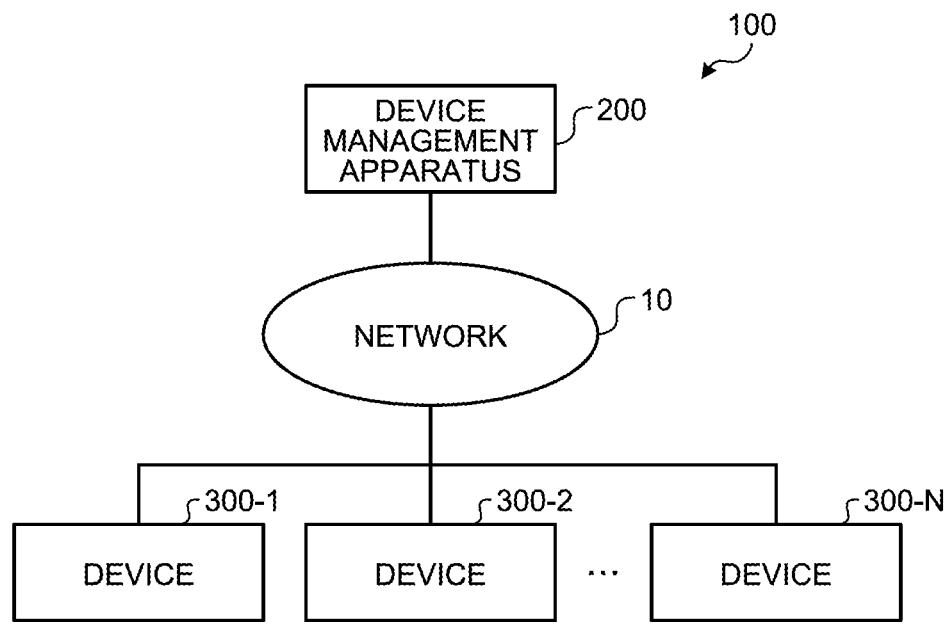
FIG. 1 is a block diagram illustrating an example of a configuration of a device management system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

The following describes embodiments of a device management apparatus, a device management system, and a verification method according to the present invention in detail with reference to the attached drawings.

An embodiment has an object to provide a device management apparatus, a device management system, and a verification method that can determine whether the operation of the device updated with the updating program can be guaranteed.

First Embodiment

FIG. 1 is a block diagram illustrating an example of a configuration of a device management system 100 according to a first embodiment. As illustrated in FIG. 1, the device management system 100 includes a device management apparatus 200 and devices 300-1 to 300-N (N is a natural number equal to or larger than 2).

The device management apparatus 200 and the devices 300-1 to 300-N are connected with each other via a network 10. The network 10 can be implemented as the Internet or a local area network (LAN), for example. An operation form of the device management system 100 may be a cloud computing type, or an on-premise type.

In the following description, when the devices 300-1 to 300-N are not required to be distinguished from each other, the devices 300-1 to 300-N may be simply called the device 300.

The device management apparatus 200 manages the device 300 via the network 10. For example, one or more computers can be exemplified as the device management apparatus 200, but the device management apparatus 200 is not limited thereto. The first embodiment describes an example of a case in which the device management apparatus 200 is implemented as one computer, but the device management apparatus 200 is not limited thereto. The device management apparatus 200 may be implemented as two or more computers (that is, implemented as a system), and a function of the device management apparatus 200 (described later) may be implemented by two or more computers in a distributed manner.

The first embodiment describes an example of a case in which the device management apparatus 200 manages updating of the device 300 by introduction of a computer program, such as updating of the device 300 using firmware. However, management content of the device 300 by the device management apparatus 200 is not limited thereto.

Figure 2:
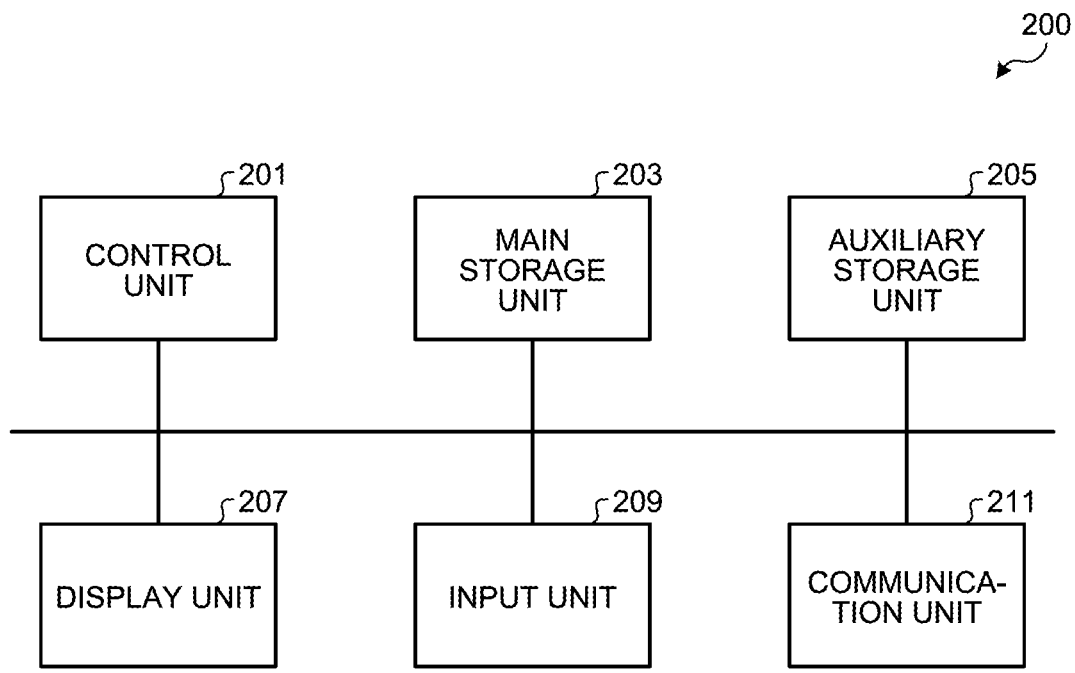
FIG. 2 is a block diagram illustrating an example of a hardware configuration of a device management apparatus according to the first embodiment.

FIG. 2 is a block diagram illustrating an example of a hardware configuration of the device management apparatus 200 according to the first embodiment. As illustrated in FIG. 2, the device management apparatus 200 includes a control unit 201 such as a central processing unit (CPU) and a graphics processing unit (GPU), a main storage unit 203 such as a read only memory (ROM) and a random access memory (RAM), an auxiliary storage unit 205 such as a hard disk drive (HDD) and a solid state drive (SSD), a display unit 207 such as a display, an input unit 209 such as a mouse, a keyboard, or a touch panel, and a communication unit 211 such as a communication interface, and has a typical hardware configuration utilizing a computer.

The auxiliary storage unit 205, the display unit 207, the input unit 209, and the communication unit 211 may be internal or external. Further, in addition to or alternative to the hardware elements described above, the device management apparatus 200 may include hardware elements such as an integrated circuit (IC), an application specific integrated circuit (ASIC), and various sensors.

The device 300 is an electronic device managed by the device management apparatus 200 via the network 10. Examples of the device 300 include an image forming device such as a printing device, a copying machine, a multifunction peripheral, a scanner device, and a facsimile device, various electronic devices such as a projector, a camera, an air conditioner, a refrigerator, a fluorescent light, a vending machine, and a hand-held terminal, and an information processing device such as a personal computer (PC) and a smart device, but are not limited thereto. A multifunction peripheral has at least two of a copying function, a printing function, a scanner function, and a facsimile function. The first embodiment describes an example of a case in which the device 300 is a multifunction peripheral, but the device 300 is not limited thereto.

Figure 3:
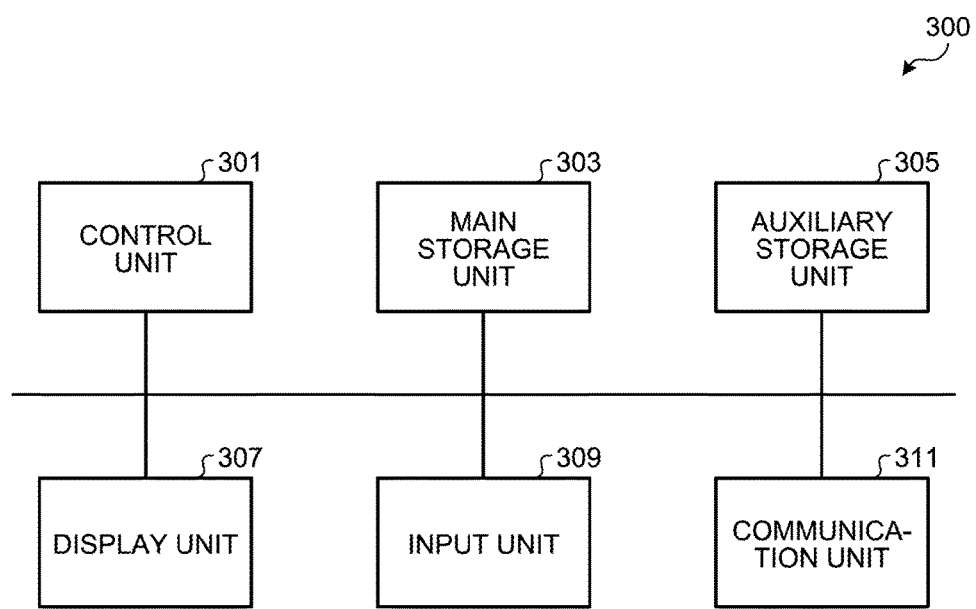
FIG. 3 is a block diagram illustrating an example of a principal hardware configuration of a device according to the first embodiment.

FIG. 3 is a block diagram illustrating an example of a principal hardware configuration of the device 300 according to the first embodiment. As illustrated in FIG. 3, the device 300 includes a control unit 301 such as a CPU and a GPU, a main storage unit 303 such as a ROM and a RAM, an auxiliary storage unit 305 such as an HDD and an SSD, a display unit 307 such as a display, an input unit 309 such as a mouse, a keyboard, or a touch panel, and a communication unit 311 such as a communication interface, and has a typical hardware configuration utilizing a computer.

The auxiliary storage unit 305, the display unit 307, the input unit 309, and the communication unit 311 may be internal or external. In addition to the hardware elements described above, the device 300 includes hardware elements matching with the device 300 such as an IC, an ASIC, and various sensors. Further, the hardware elements such as the IC and the ASIC may be alternative to the above-described hardware elements such as the CPU and the GPU.

Figure 4:
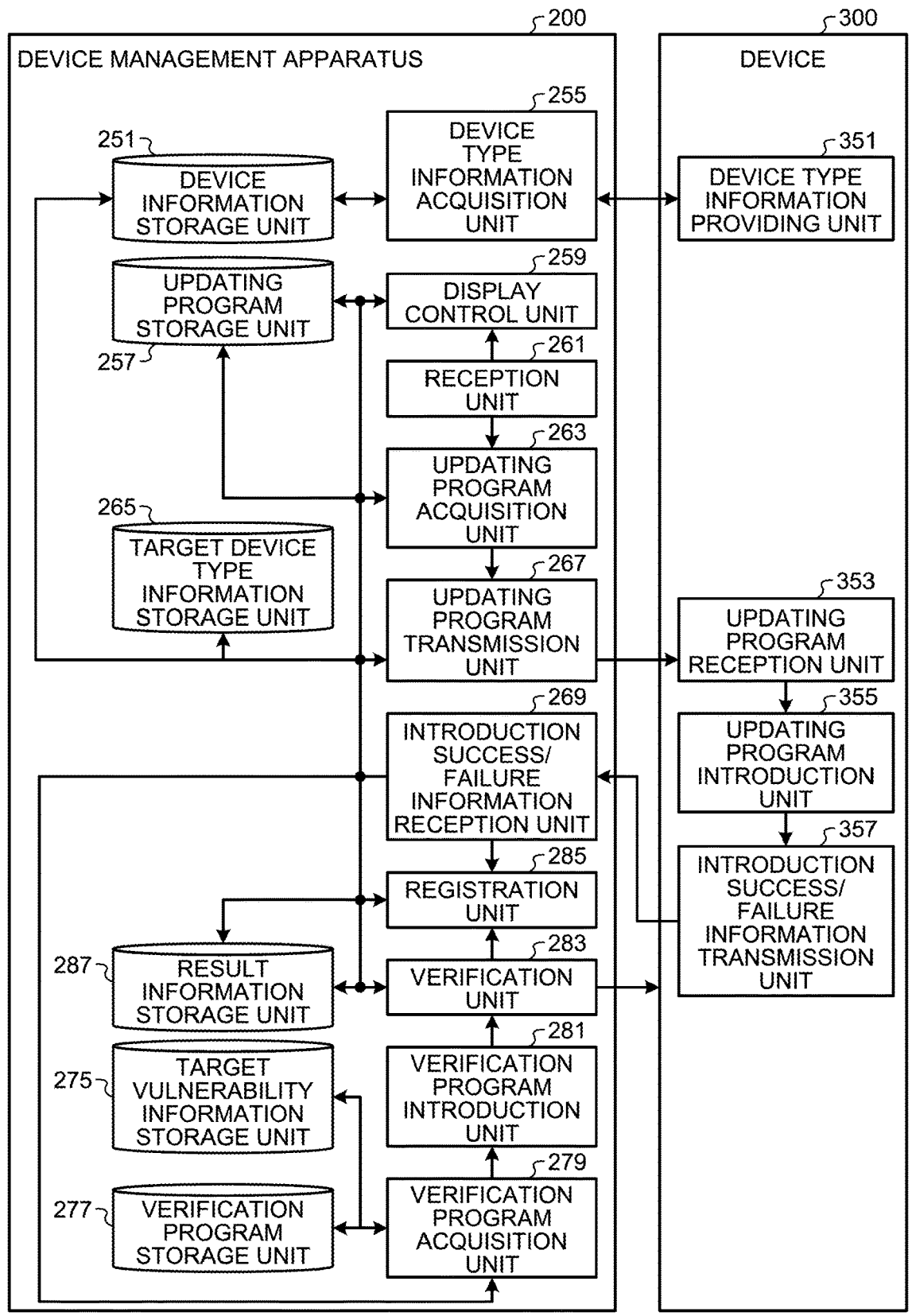
FIG. 4 is a block diagram illustrating an example of a functional configuration of the device management apparatus and the device according to the first embodiment.

FIG. 4 is a block diagram illustrating an example of a functional configuration of the device management apparatus 200 and the device 300 according to the first embodiment. As illustrated in FIG. 4, the device management apparatus 200 includes a device information storage unit 251, a device type information acquisition unit 255, an updating program storage unit 257, a display control unit 259, a reception unit 261, an updating program acquisition unit 263, a target device type information storage unit 265, an updating program transmission unit 267, an introduction success/failure information reception unit 269, a target vulnerability information storage unit 275, a verification program storage unit 277, a verification program acquisition unit 279, a verification program introduction unit 281, a verification unit 283, a registration unit 285, and a result information storage unit 287.

The device information storage unit 251, the updating program storage unit 257, the target device type information storage unit 265, the target vulnerability information storage unit 275, the verification program storage unit 277, and the result information storage unit 287 can be implemented, for example, by the auxiliary storage unit 205. The device type information acquisition unit 255, the updating program transmission unit 267, the introduction success/failure information reception unit 269, and the verification unit 283 can be implemented, for example, by the control unit 201, the main storage unit 203, and the communication unit 211. The display control unit 259, the reception unit 261, the updating program acquisition unit 263, the verification program acquisition unit 279, the verification program introduction unit 281, and the registration unit 285 can be implemented, for example, by the control unit 201 and the main storage unit 203.

As illustrated in FIG. 4, the device 300 includes a device type information providing unit 351, an updating program reception unit 353, an updating program introduction unit 355, and an introduction success/failure information transmission unit 357.

The device type information providing unit 351, the updating program reception unit 353, and the introduction success/failure information transmission unit 357 may be implemented, for example, by the control unit 301, the main storage unit 303, and the communication unit 311. The updating program introduction unit 355 may be implemented, for example, by the control unit 301 and the main storage unit 303.

The device information storage unit 251 stores therein device information of each of the devices 300-1 to 300-N. FIG. 5 is a diagram illustrating an example of device information stored in the device information storage unit 251 according to the first embodiment, and illustrates an example of the device information stored in the device information storage unit 251 at the beginning of operation of the device management apparatus 200. In the example illustrated in FIG. 5, the device information includes a device ID, an Internet protocol (IP) address, and device type information. However, at the beginning of operation of the device management apparatus 200, the device type information is not registered. The device ID is an identifier for the device 300, and the device type information is an identifier for the device type of the device 300.

At the beginning of operation of the device management apparatus 200, the device type information acquisition unit 255 acquires device information of each of the devices 300 from the device information storage unit 251. The device type information acquisition unit 255 then communicates, for each piece of acquired device information, with the device 300 indicated by the device ID included in the device information using the IP address included in the device information, acquires device type information indicating the device type of the device 300 from the device 300, and registers (stores) the acquired device type information in the device information storage unit 251 in association with the device ID and the IP address used for acquiring the device type information.

FIG. 6 is a diagram illustrating an example of the device information stored in the device information storage unit 251 according to the first embodiment, and illustrates an example of the device information stored in the device information storage unit 251 after the device type information is registered by the device type information acquisition unit 255. In the example illustrated in FIG. 6, the device type information of the device information is registered.

The device type information providing unit 351 provides device type information of the device 300 (own device). Specifically, when communication is performed by the device management apparatus 200 and acquisition of the device type information is requested, the device type information providing unit 351 provides the device type information of the device 300 to the device management apparatus 200. The device type information and the device ID of the device 300 may be stored, for example, in the main storage unit 303 or the auxiliary storage unit 305.

The updating program storage unit 257 stores therein an updating program. The updating program may be any computer program for updating the device 300. The first embodiment describes an example of a case in which the updating program is firmware for fixing vulnerability in the device 300 (for example, vulnerability in an operating system (OS), middleware, a platform, and an application installed in the device 300). However, the updating program is not limited thereto.

FIG. 7 is a diagram illustrating an example of information stored in the updating program storage unit 257 according to the first embodiment. In the example illustrated in FIG. 7, the updating program is stored in the updating program storage unit 257 in association with an updating program ID. The updating program ID is an identifier for the updating program. The updating program may be stored in the updating program storage unit 257 in a binary large object (BLOB) format, or stored in the updating program storage unit 257 in a file path format.

The reception unit 261 receives various operation inputs by an administrator or a user from the input unit 209. For example, the reception unit 261 receives, from the input unit 209, a display request input for requesting to display list information indicating a list of updating programs, and a selection input for selecting an updating program to be introduced into the device 300 from the list of updating programs.

When the reception unit 261 receives the display request input, the display control unit 259 generates the list information indicating the list of updating programs using information stored in the updating program storage unit 257, and causes the display unit 207 to display the list information. The list information may be, for example, a list in which an updating program name and an updating program ID are associated with each other.

The updating program acquisition unit 263 acquires the updating program. Specifically, the updating program acquisition unit 263 acquires, from the updating program storage unit 257, an updating program the selection input of which is received (selected) by the reception unit 261, that is, the updating program to be introduced into the device 300. In more detail, the updating program acquisition unit 263 acquires, from the updating program storage unit 257, an updating program associated with the updating program ID of the updating program the selection input of which is received by the reception unit 261.

The target device type information storage unit 265 stores therein, for each updating program ID, device type information of the device type that is a target into which the updating program indicated by the updating program ID is to be introduced. FIG. 8 is a diagram illustrating an example of information stored in the target device type information storage unit 265 according to the first embodiment. In the example illustrated in FIG. 8, the device type information is stored in the target device type information storage unit 265 in association with the updating program ID.

The updating program transmission unit 267 transmits the updating program acquired by the updating program acquisition unit 263 to the device 300.

Specifically, the updating program transmission unit 267 acquires, from the target device type information storage unit 265, the device type information associated with the updating program ID of the updating program acquired by the updating program acquisition unit 263. The updating program transmission unit 267 further acquires device information including the device type indicated by the acquired device type information from the device information storage unit 251.

For example, when the device type indicated by the device type information acquired by the updating program transmission unit 267 is "A", and the device information stored in the device information storage unit 251 is the device information illustrated in FIG. 6, the updating program transmission unit 267 acquires, from the device information storage unit 251, the device information the device ID of which is "1", the device information the device ID of which is "2", and the device information the device ID of which is "3".

The updating program transmission unit 267 then communicates, for each piece of acquired device information, with the device 300 indicated by the device ID included in the device information using the IP address included in the device information, and transmits the updating program and the updating program ID acquired by the updating program acquisition unit 263 to the device 300.

The updating program reception unit 353 receives the updating program and the updating program ID from the device management apparatus 200.

The updating program introduction unit 355 introduces the updating program received by the updating program reception unit 353 into the device 300. The first embodiment exemplifies a case in which introduction of the updating program means that the updating program is installed in the device 300 to update the device 300 using the updating program (firmware for fixing vulnerability), that is, to fix (update) the vulnerability in the device 300. However, the introduction of the updating program is not limited thereto. For example, the updating program introduction unit 355 installs the updating program in the device 300 using an installer included in the updating program.

The introduction success/failure information transmission unit 357 transmits, to the device management apparatus 200, introduction success/failure information indicating whether the updating program is successfully introduced by the updating program introduction unit 355. Specifically, the introduction success/failure information transmission unit 357 transmits, to the device management apparatus 200, the updating program ID, the introduction success/failure information of the updating program indicated by the updating program ID, and the device ID of the device 300 (own device).

In the first embodiment, the introduction success/failure information indicates success in introduction when the updating program introduction unit 355 successfully installs the updating program in the device 300, and indicates failure in introduction when the updating program introduction unit 355 fails to introduce the updating program in the device 300. However, the introduction success/failure information is not limited thereto.

The introduction success/failure information reception unit 269 receives, from the device 300, the updating program ID, the introduction success/failure information, and the device ID of the device 300.

The target vulnerability information storage unit 275 stores therein, for each updating program ID, a vulnerability ID indicating vulnerability to be fixed by the updating program indicated by the updating program ID. The vulnerability ID is an identifier for identifying the vulnerability. FIG. 9 is a diagram illustrating an example of information stored in the target vulnerability information storage unit 275 according to the first embodiment. In the example illustrated in FIG. 9, the vulnerability ID is stored in the target vulnerability information storage unit 275 in association with the updating program ID.

The verification program storage unit 277 stores therein a verification program for verifying the operation of the device 300 updated with the updating program. The verification program may be any software such as a plug-in, a script, and an application so long as the verification program is a computer program for verifying the operation of the device 300 updated with the updating program.

The first embodiment exemplifies a case in which the verification program is a plug-in for verifying whether the vulnerability is fixed in the device 300 updated with the updating program (the device 300 in which firmware for fixing the vulnerability is installed). However, the verification program is not limited thereto. Examples of such a plug-in include a plug-in of a vulnerability detection scanner (vulnerability detection application) such as Nessus.

FIG. 10 is a diagram illustrating an example of information stored in the verification program storage unit 277 according to the first embodiment. In the example illustrated in FIG. 10, the verification program is stored in the verification program storage unit 277 in association with the vulnerability ID. The vulnerability indicated by the vulnerability ID associated with the verification program is a vulnerability to be verified with the verification program. The verification program may be stored in the verification program storage unit 277 in a BLOB format, or stored in the verification program storage unit 277 in a file path format.

When the introduction success/failure information received by the introduction success/failure information reception unit 269 indicates success in introduction, the verification program acquisition unit 279 acquires the verification program. Specifically, when the introduction success/failure information received by the introduction success/failure information reception unit 269 indicates success in introduction, the verification program acquisition unit 279 acquires the vulnerability ID associated with the updating program ID received by the introduction success/failure information reception unit 269 from the target vulnerability information storage unit 275, and acquires the verification program associated with the vulnerability ID from the verification program storage unit 277.

The verification program introduction unit 281 introduces the verification program acquired by the verification program acquisition unit 279 into the device management apparatus 200. As described above, in the first embodiment, the verification program is a plug-in for verifying whether the vulnerability is fixed, so that the verification program introduction unit 281 installs the verification program acquired by the verification program acquisition unit 279 in the vulnerability detection application installed in the device management apparatus 200.

The verification unit 283 verifies whether the operation of the device 300 updated with the updating program can be guaranteed based on the verification program acquired by the verification program acquisition unit 279. Specifically, the verification unit 283 acquires the device information including the device ID received by the introduction success/failure information reception unit 269 from the device information storage unit 251, communicates with the device 300 (the device 300 updated with the updating program) indicated by the device ID included in the acquired device information using the IP address included in the device information, and verifies whether the operation of the device 300 can be guaranteed.

In the first embodiment, the verification unit 283 verifies whether the vulnerability to be verified with the verification program is fixed in the device 300 based on the verification program (plug-in for verifying whether the vulnerability is fixed) acquired by the verification program acquisition unit 279. For example, the verification unit 283 makes pseudo attack related to the vulnerability to be verified on the device 300 to verify whether the vulnerability is fixed in the device 300. In the first embodiment, the verification unit 283 is implemented by the vulnerability detection application in which the verification program is installed.

The registration unit 285 registers, for each of the devices 300, an introduction result of the updating program and a verification result of the verification unit 283 in the result information storage unit 287. Specifically, the registration unit 285 registers the introduction success/failure information in the result information storage unit 287 as the introduction result of the updating program, and registers verification result information indicating the verification result in the result information storage unit 287 as the verification result of the verification unit 283. In the first embodiment, the verification result information indicates success in fixing when the vulnerability is fixed in the device 300, and indicates failure in fixing when the vulnerability is not fixed in the device 300. However, the verification result information is not limited thereto.

FIG. 11 is a diagram illustrating an example of information stored in the result information storage unit 287 according to the first embodiment. FIG. 11 exemplifies information indicating an example of a result obtained when the updating program acquisition unit 263 acquires the updating program the updating program ID of which is "1", the updating program transmission unit 267 transmits the updating program the updating program ID of which is "1", to each of the devices 300 the device IDs of which are "1" to "3", and the verification unit 283 verifies the vulnerabilities the vulnerability IDs of which are "CVE-2015-1001" and "CVE-2015-1002".

It is assumed that the updating program the updating program ID of which is "1" is successfully introduced in the device 300 the device ID of which is "1", and the vulnerabilities the vulnerability IDs of which are "CVE-2015-1001" and "CVE-2015-1002" are fixed as a result of verification. Thus, result information in the first column and the second column illustrated in FIG. 11 is registered.

It is assumed that the updating program the updating program ID of which is "1" fails to be introduced in the device 300 the device ID of which is "2". Thus, result information in the third column illustrated in FIG. 11 is registered. When the updating program fails to be introduced, the vulnerability is not verified, so that the vulnerability ID and the verification result information are not registered.

It is assumed that the updating program the updating program ID of which is "1" is successfully introduced in the device 300 the device ID of which is "3", and the vulnerability the vulnerability ID of which is "CVE-2015-1001" is fixed as a result of verification, but the vulnerability the vulnerability ID of which is "CVE-2015-1002" is not fixed. Thus, result information in the fourth column and the fifth column illustrated in FIG. 11 is registered.

Figure 12:
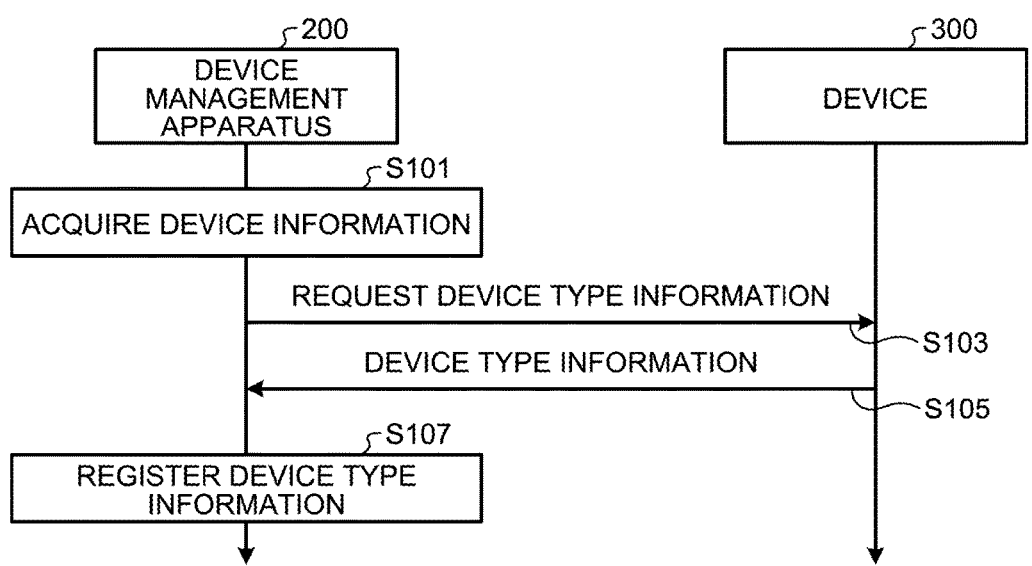
FIG. 12 is a sequence diagram illustrating an example of device type information registration processing executed in the device management system according to the first embodiment.

FIG. 12 is a sequence diagram illustrating an example of device type information registration processing executed in the device management system 100 according to the first embodiment.

First, at the beginning of operation of the device management apparatus 200, the device type information acquisition unit 255 acquires device information of each of the devices 300 from the device information storage unit 251 (Step S101).

Subsequently, the device type information acquisition unit 255 communicates with the device 300 indicated by the device ID included in the acquired device information using the IP address included in the device information, and requests the device type information from the device 300 (Step S103).

Subsequently, when the device type information is requested by the device management apparatus 200, the device type information providing unit 351 provides the device type information of the device 300 to the device management apparatus 200 (Step S105).

Subsequently, the device type information acquisition unit 255 acquires the device type information provided by the device 300, and registers (stores) the acquired device type information in the device information storage unit 251 in association with the device ID and the IP address used for acquiring the device type information (Step S107).

The processing at Steps S103 to S107 is performed for each piece of device information acquired at Step S101.

Figure 13:
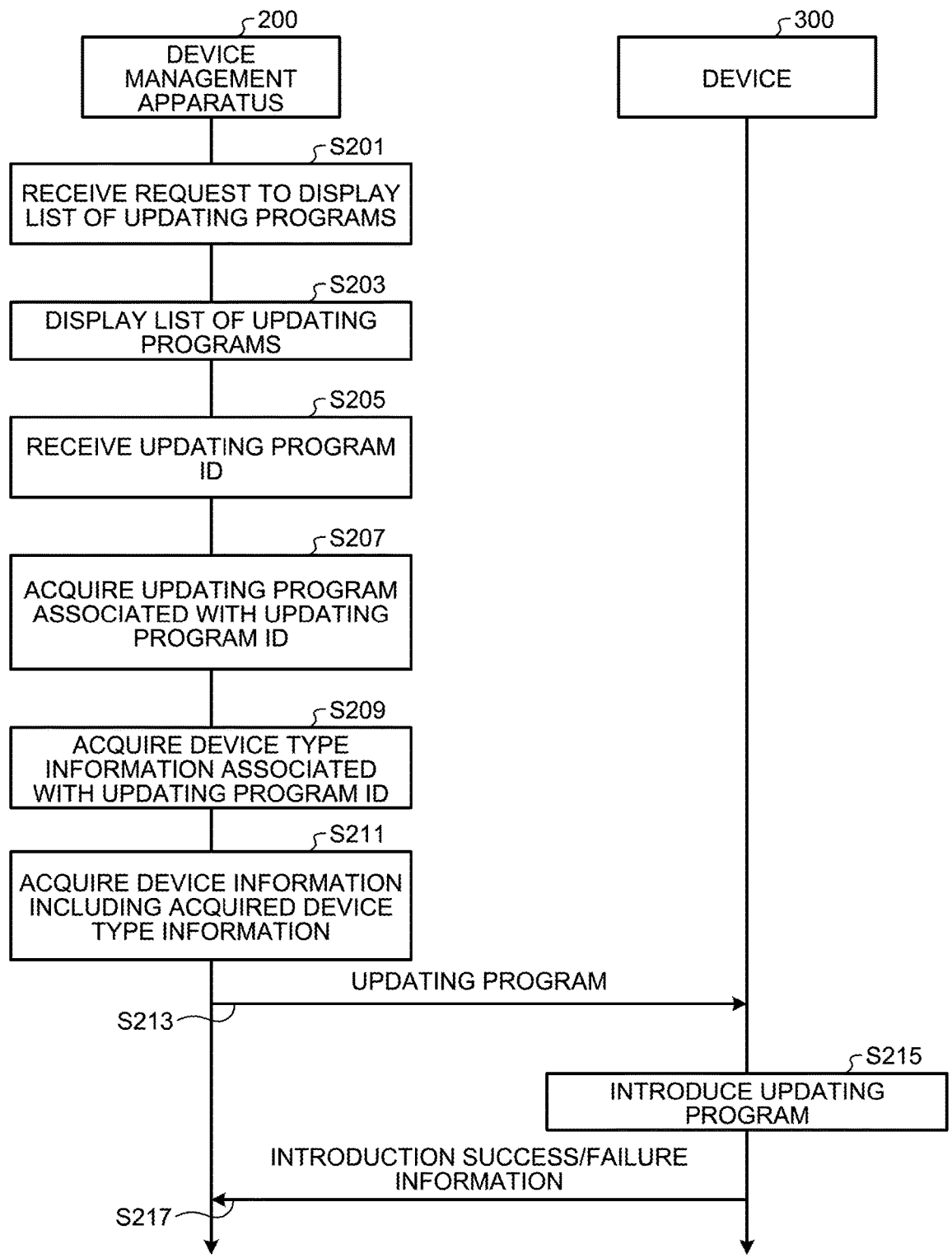
FIG. 13 is a sequence diagram illustrating an example of introduction processing executed in the device management system according to the first embodiment.

FIG. 13 is a sequence diagram illustrating an example of introduction processing executed in the device management system 100 according to the first embodiment. The processing illustrated in FIG. 12 is assumed to be completed by the time when the processing illustrated in FIG. 13 is performed.

First, the reception unit 261 receives, from the input unit 209, a display request input for requesting to display list information indicating a list of updating programs (Step S201).

Subsequently, when the reception unit 261 receives the display request input, the display control unit 259 generates the list information indicating the list of updating programs using the information stored in the updating program storage unit 257, and causes the display unit 207 to display the list information (Step S203).

Subsequently, the reception unit 261 receives a selection input for selecting the updating program (updating program ID) to be introduced into the device 300 from the displayed list of updating programs (Step S205).

Subsequently, the updating program acquisition unit 263 acquires, from the updating program storage unit 257, the updating program associated with the updating program ID of the updating program the selection input of which is received by the reception unit 261 (Step S207).

Subsequently, the updating program transmission unit 267 acquires, from the target device type information storage unit 265, the device type information associated with the updating program ID of the updating program acquired by the updating program acquisition unit 263 (Step S209).

Subsequently, the updating program transmission unit 267 acquires, from the device information storage unit 251, the device information including the device type indicated by the acquired device type information (Step S211).

Subsequently, the updating program transmission unit 267 communicates, for each piece of acquired device information, with the device 300 indicated by the device ID included in the device information using the IP address included in the device information, and transmits the updating program and the updating program ID acquired by the updating program acquisition unit 263 to the device 300. The updating program reception unit 353 receives the updating program and the updating program ID from the device management apparatus 200 (Step S213).

Subsequently, the updating program introduction unit 355 introduces the updating program received by the updating program reception unit 353 into the device 300 (Step S215).

Subsequently, the introduction success/failure information transmission unit 357 transmits, to the device management apparatus 200, the updating program ID of the updating program on which introduction processing is performed by the updating program introduction unit 355, the introduction success/failure information of the updating program indicated by the updating program ID, and the device ID of the device 300 (own device), and the introduction success/failure information reception unit 269 receives the updating program ID, the introduction success/failure information, and the device ID from the device 300 (Step S217).

The processing at Steps S213 to S217 is performed for each piece of device information acquired at Step S211.

Figure 14:
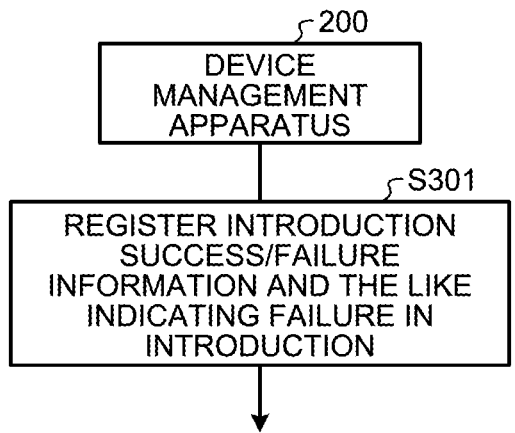
FIG. 14 is a sequence diagram illustrating an example of registration processing executed in the device management system according to the first embodiment.

FIG. 14 is a sequence diagram illustrating an example of registration processing executed in the device management system 100 according to the first embodiment. The registration processing illustrated in FIG. 14 is performed when the introduction success/failure information received at Step S217 in the processing illustrated in FIG. 13 indicates failure in introduction.

When the introduction success/failure information received by the introduction success/failure information reception unit 269 indicates failure in introduction, the registration unit 285 registers, in the result information storage unit 287, the introduction success/failure information indicating failure in introduction, and the like as an introduction result of the updating program (Step S301). In this case, the registration unit 285 registers, in the result information storage unit 287, for example, time information indicating time at which the updating program fails to be introduced, the updating program ID of the updating program that fails to be introduced, the device ID of the device 300 into which the updating program fails to be introduced, the introduction success/failure information indicating failure in introduction, and the like.

Figure 15:
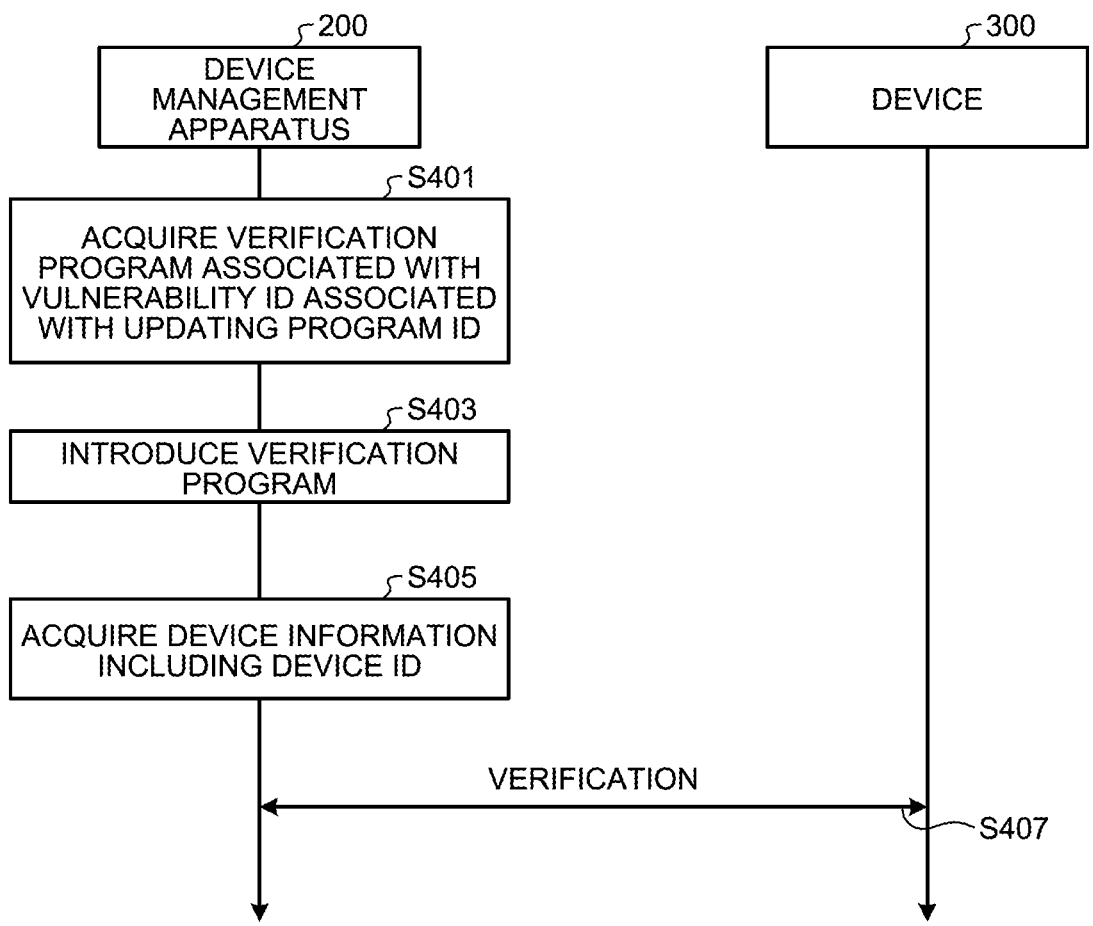
FIG. 15 is a sequence diagram illustrating an example of verification processing executed in the device management system according to the first embodiment.

FIG. 15 is a sequence diagram illustrating an example of verification processing executed in the device management system 100 according to the first embodiment. The verification processing illustrated in FIG. 15 is performed when the introduction success/failure information received at Step S217 in the processing illustrated in FIG. 13 indicates success in introduction.

First, when the introduction success/failure information received by the introduction success/failure information reception unit 269 indicates success in introduction, the verification program acquisition unit 279 acquires, from the target vulnerability information storage unit 275, the vulnerability ID associated with the updating program ID of the updating program transmitted by the updating program transmission unit 267, and acquires the verification program associated with the vulnerability ID from the verification program storage unit 277 (Step S401).

Subsequently, the verification program introduction unit 281 introduces the verification program acquired by the verification program acquisition unit 279 into the device management apparatus 200 (Step S403).

Subsequently, the verification unit 283 acquires, from the device information storage unit 251, the device information including the device ID received by the introduction success/failure information reception unit 269 (Step S405), communicates with the device 300 indicated by the device ID included in the acquired device information (the device 300 updated with the updating program) using the IP address included in the device information, and verifies whether the vulnerability to be verified with the verification program introduced by the verification program introduction unit 281 is fixed in the device 300 (Step S407).

The processing at Steps S403 to S407 is performed for each verification program acquired at Step S401.

Figure 16:
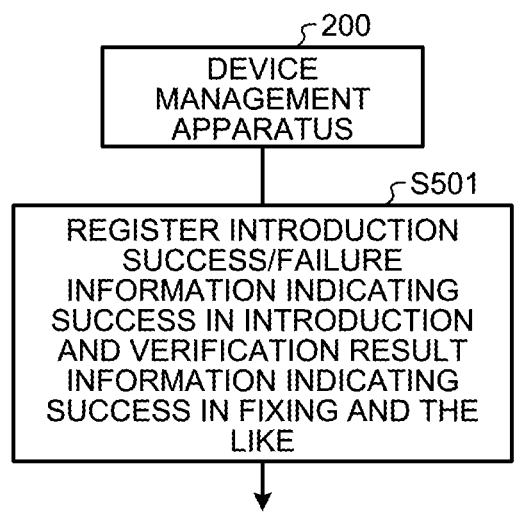
FIG. 16 is a sequence diagram illustrating an example of the registration processing executed in the device management system according to the first embodiment.

FIG. 16 is a sequence diagram illustrating an example of the registration processing executed in the device management system 100 according to the first embodiment. The registration processing illustrated in FIG. 16 is performed when the vulnerability is fixed as a result of verification at Step S407 in the processing illustrated in FIG. 15.

When the verification result information as a verification result of the verification unit 283 indicates success in fixing, the registration unit 285 registers, in the result information storage unit 287, the introduction success/failure information indicating success in introduction as an introduction result of the updating program, and the verification result information indicating success in fixing as a verification result (Step S501). In this case, for example, the registration unit 285 registers, in the result information storage unit 287, time information indicating time at which verification is completed, the updating program ID of the updating program that is successfully introduced, the device ID of the device 300 into which the updating program is successfully introduced, the introduction success/failure information indicating success in introduction, the vulnerability ID of the vulnerability that is successfully fixed, the verification result information indicating success in fixing, and the like.

Figure 17:
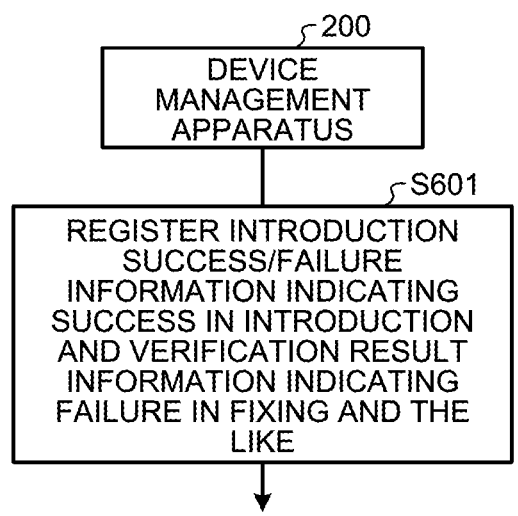
FIG. 17 is a sequence diagram illustrating an example of the registration processing executed in the device management system according to the first embodiment.

FIG. 17 is a sequence diagram illustrating an example of the registration processing executed in the device management system 100 according to the first embodiment. The registration processing illustrated in FIG. 17 is performed when the vulnerability is not fixed as a result of verification at Step S407 in the processing illustrated in FIG. 15.

When the verification result information as a verification result of the verification unit 283 indicates failure in fixing, the registration unit 285 registers, in the result information storage unit 287, the introduction success/failure information indicating success in introduction as an introduction result of the updating program, and the verification result information indicating failure in fixing as a verification result (Step S601). In this case, for example, the registration unit 285 registers, in the result information storage unit 287, the time information indicating time at which verification is completed, the updating program ID of the updating program that is successfully introduced, the device ID of the device 300 into which the updating program is successfully introduced, the introduction success/failure information indicating success in introduction, the vulnerability ID of the vulnerability that fails to be fixed, the verification result information indicating failure in fixing, and the like.

Figure 18:
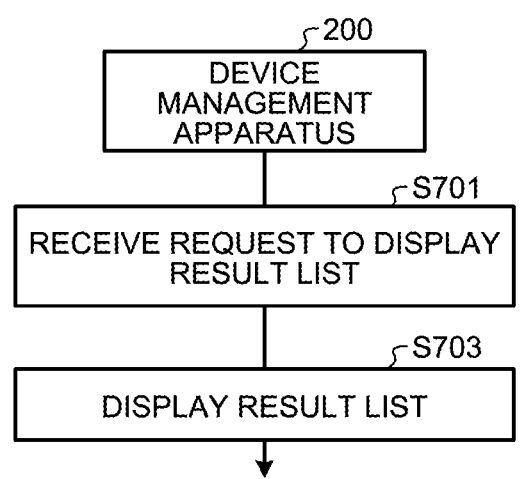
FIG. 18 is a sequence diagram illustrating an example of confirmation processing executed in the device management system according to the first embodiment.

FIG. 18 is a sequence diagram illustrating an example of confirmation processing executed in the device management system 100 according to the first embodiment.

The reception unit 261 receives, from the input unit 209, a result display request input for requesting to display result list information indicating a list of updating program introduction result and the verification result of vulnerability (Step S701).

Subsequently, when the reception unit 261 receives the result display request input, the display control unit 259 generates the result list information indicating the list of the updating program introduction result and the verification result of vulnerability using the information stored in the result information storage unit 287, and causes the display unit 207 to display the result list information (Step S703).

As described above, according to the first embodiment, when the updating program (firmware for fixing the vulnerability) is introduced into the device 300, it is verified whether the operation of the device 300 updated with the updating program can be guaranteed (whether the vulnerability is fixed), so that it can be determined whether the operation of the device 300 updated with the updating program can be guaranteed, and the operation of the updated device 300 can be guaranteed (the vulnerability is fixed).

Specifically, according to the first embodiment, the verification result is registered as a log and the verification result can be displayed, so that an administrator can allow a user to use the device 300 updated with the updating program with security by confirming the verification result.

First Modification

The first modification describes an example of performing retry processing in the first embodiment.

In the first modification, when the introduction success/failure information received by the introduction success/failure information reception unit 269 indicates failure in introduction, the updating program transmission unit 267 retransmits the updating program to the device 300.

Specifically, the updating program transmission unit 267 acquires, from the result information storage unit 287, the device ID associated with the introduction success/failure information indicating failure in introduction, and acquires the device information including the device ID from the device information storage unit 251.

The updating program transmission unit 267 extracts, from among device IDs stored in the result information storage unit 287, the device ID of the device 300 that is a target into which the updating program is to be reintroduced, using SQL as described below, for example.

```
SELECT device ID FROM log table AS L1
    WHERE updating program ID = <selected updating program ID>
    AND introduction success/failure information = 'NG'
    AND NOT EXISTS (
        SELECT 1 FROM log table AS L2
        WHERE updating program ID = <selected updating program ID>
        AND introduction success/failure information = 'NG'
        AND L1. device ID = L2. device ID
        AND L1. time information < L2. time information
    )
```

In this case, a log table indicates information (log) stored in the result information storage unit 287. In the above example, it is assumed that an administrator or the like selects the updating program ID of the updating program to be retransmitted. However, the updating program ID may be extracted together with the device ID.

The updating program transmission unit 267 communicates with the device 300 indicated by the device ID included in the acquired device information using the IP address included in the device information, and retransmits the updating program as a retransmission target to the device 300.

If the updating program transmission unit 267 does not hold the updating program as the retransmission target at the time when retransmission is performed, the updating program transmission unit 267 may cause the updating program acquisition unit 263 to acquire the updating program again.

Accordingly, the updating program is reintroduced into the device 300 to which the updating program is retransmitted.

In the first modification, when the verification result information indicating the verification result indicates that the operation of the updated device cannot be guaranteed (failure in fixing the vulnerability), the verification unit 283 reverifies whether the operation of the updated device 300 can be guaranteed based on the verification program.

Specifically, the verification unit 283 acquires, from the result information storage unit 287, the device ID and the vulnerability ID associated with the verification result information indicating failure in fixing, and acquires the device information including the device ID from the device information storage unit 251.

The verification unit 283 extracts, from among device IDs and vulnerability IDs stored in the result information storage unit 287, the device ID of the device 300 as a reverification target and the vulnerability ID of the vulnerability, using SQL as described below, for example.

```
SELECT device ID, vulnerability ID FROM log table AS L1
    WHERE updating program ID = <selected updating program ID>
    AND verification result information = 'NG'
    AND NOT EXISTS (
        SELECT 1 FROM log table AS L2
        WHERE updating program ID = <selected updating program ID>
        AND verification result information = 'NG'
        AND L1. device ID = L2. device ID
        AND L1. vulnerability ID = L2. vulnerability ID
        AND L1. time information < L2. time information
    )
```

The verification unit 283 communicates with the device 300 indicated by the device ID included in the acquired device information using the IP address included in the device information, and reverifies whether the vulnerability indicated by the acquired vulnerability ID is fixed in the device 300.

Accordingly, whether the vulnerability is fixed is reverified in the device 300.

When the updating program is reintroduced or the vulnerability is reverified, the registration unit 285 further registers a reintroduction result of the updating program or a reverification result of the verification unit 283 in the result information storage unit 287.

FIG. 19 is a diagram illustrating an example of information stored in the result information storage unit 287 according to a first modification. The result information storage unit 287 further stores therein result information such as the reintroduction result of the updating program and the reverification result of the verification unit 283 in addition to the result information illustrated in FIG. 11. The result information in the first to fifth columns is the same as the result information in the first to fifth columns illustrated in FIG. 11.

In this case, regarding the result information in the third column, the introduction success/failure information indicates failure in introduction (NG), so that the updating program transmission unit 267 retransmits the updating program the updating program ID of which is "1" to the device 300 the device ID of which is "2", and the updating program is reintroduced. When the updating program is successfully reintroduced, the result information in the third column is further reverified by the verification unit 283.

It is assumed that the updating program the updating program ID of which is "1" is successfully reintroduced into the device 300 the device ID of which is "2", and the vulnerabilities the vulnerability ID of which is "CVE-2015-

1001" and the vulnerability the vulnerability ID of which is "CVE-2015-1002" are both fixed as a result of verification. Thus, the result information in the sixth column and the seventh column illustrated in FIG. 19 is registered.

Regarding the result information in the fifth column, the verification result information indicates failure in fixing (NG), so that the verification unit 283 reverifies the vulnerability ID "CVE-2015-1002" for the device 300 the device ID of which is "3".

Regarding the device 300 the device ID of which is "3", the vulnerability the vulnerability ID of which is "CVE-2015-1002" is assumed to be fixed as a result of reverification. Thus, the result information in the eighth column illustrated in FIG. 19 is registered.

Figure 20:
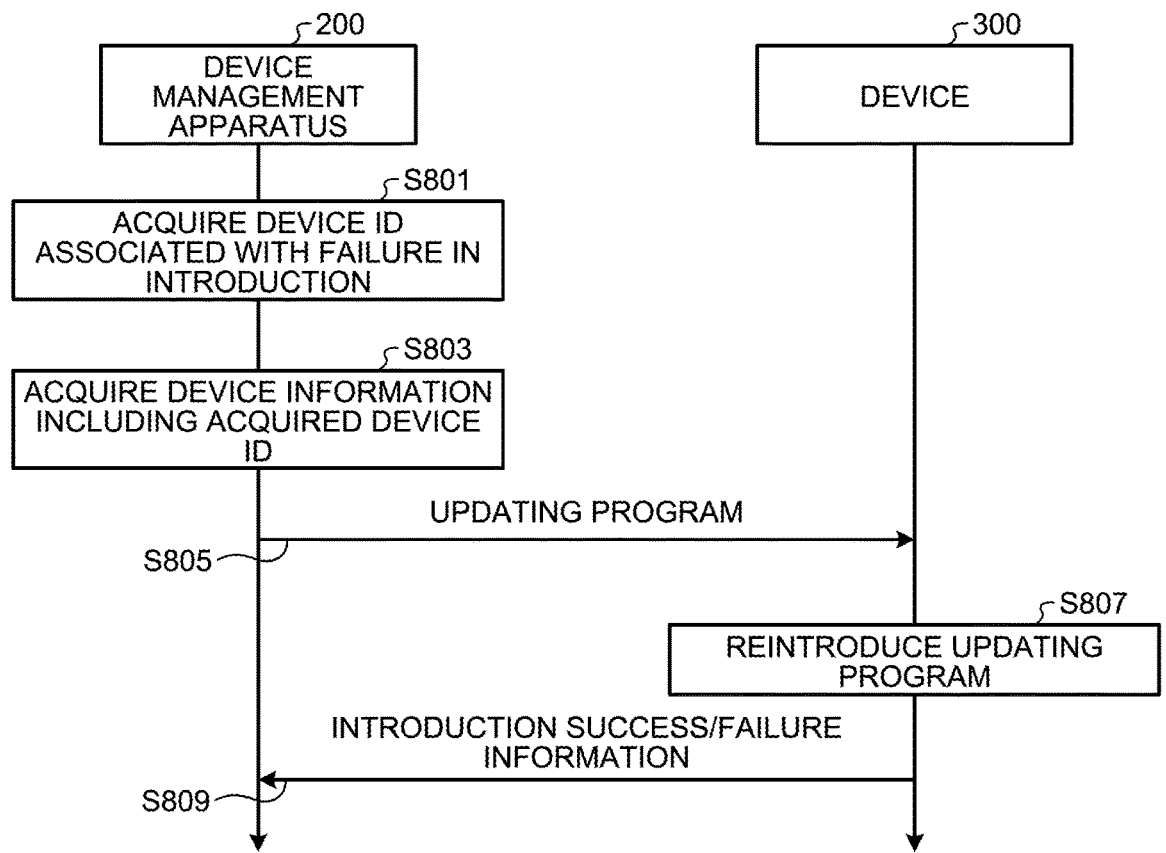
FIG. 20 is a sequence diagram illustrating an example of reintroduction processing executed in a device management system according to the first modification.

FIG. 20 is a sequence diagram illustrating an example of reintroduction processing executed in the device management system 100 according to the first modification.

First, the updating program transmission unit 267 acquires, from the result information storage unit 287, the device ID associated with the introduction success/failure information indicating failure in introduction (Step S801).

Subsequently, the updating program transmission unit 267 acquires the device information including the acquired device ID from the device information storage unit 251 (Step S803).

Subsequently, the updating program transmission unit 267 communicates with the device 300 indicated by the device ID included in the acquired device information using the IP address included in the device information, and transmits the updating program as a retransmission target and the updating program ID to the device 300. The updating program reception unit 353 receives the updating program and the updating program ID from the device management apparatus 200 (Step S805).

Subsequently, the updating program introduction unit 355 reintroduces the updating program received by the updating program reception unit 353 into the device 300 (Step S807).

Subsequently, the introduction success/failure information transmission unit 357 transmits, to the device management apparatus 200, the updating program ID of the updating program on which reintroduction processing is performed by the updating program introduction unit 355, the introduction success/failure information of the updating program indicated by the updating program ID, and the device ID of the device 300 (own device). The introduction success/failure information reception unit 269 receives the updating program ID, the introduction success/failure information, and the device ID from the device 300 (Step S809).

The processing at Steps S805 to S809 is performed for each piece of device information acquired at Step S803. When the introduction success/failure information received at Step S809 indicates failure in introduction, the processing illustrated in FIG. 14 is performed thereafter. When the introduction success/failure information received at Step S809 indicates success in introduction, the processing illustrated in FIG. 15 is performed thereafter.

Figure 21:
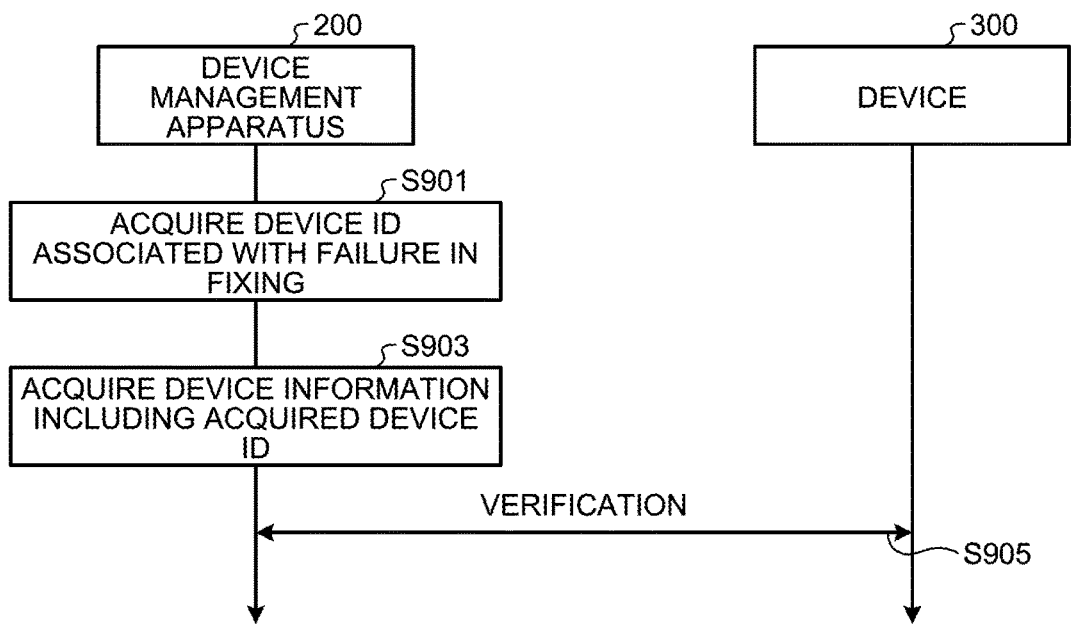
FIG. 21 is a sequence diagram illustrating an example of reverification processing executed in the device management system according to the first modification.

FIG. 21 is a sequence diagram illustrating an example of reverification processing executed in the device management system 100 according to the first modification.

First, the verification unit 283 acquires, from the result information storage unit 287, the device ID and the vulnerability ID associated with the verification result information indicating failure in fixing (Step S901).

Subsequently, the verification unit 283 acquires the device information including the acquired device ID from the device information storage unit 251 (Step S903), communicates with the device 300 indicated by the device ID included in the acquired device information using the IP address included in the device information, and reverifies whether the vulnerability indicated by the acquired vulnerability ID is fixed in the device 300 (Step S905).

The processing at Step S905 is performed for each piece of device information acquired at Step S903. When the reverification result at Step S905 indicates success in fixing, the processing illustrated in FIG. 16 is performed thereafter. When the reverification result at Step S905 indicates failure in fixing, the processing illustrated in FIG. 17 is performed thereafter.

As described above, according to the first modification, the updating program (firmware for fixing the vulnerability) is reintroduced, and whether the operation of the device 300 updated with the updating program can be guaranteed (whether the vulnerability is fixed) is reverified. Thus, the first modification can deal with a case in which the updating program fails to be introduced or whether the operation of the device 300 can be guaranteed fails to be verified for some reasons such as disconnection of the network 10.

Second Embodiment

The second embodiment describes an example of interrupting power supply of the device into which the updating program fails to be introduced or the device the operation of which cannot be guaranteed. The following mainly describes differences between the first embodiment and the second embodiment. The component having the same function as in the first embodiment is denoted by the same term and the same reference numeral as in the first embodiment, and redundant description will be omitted.

Figure 22:
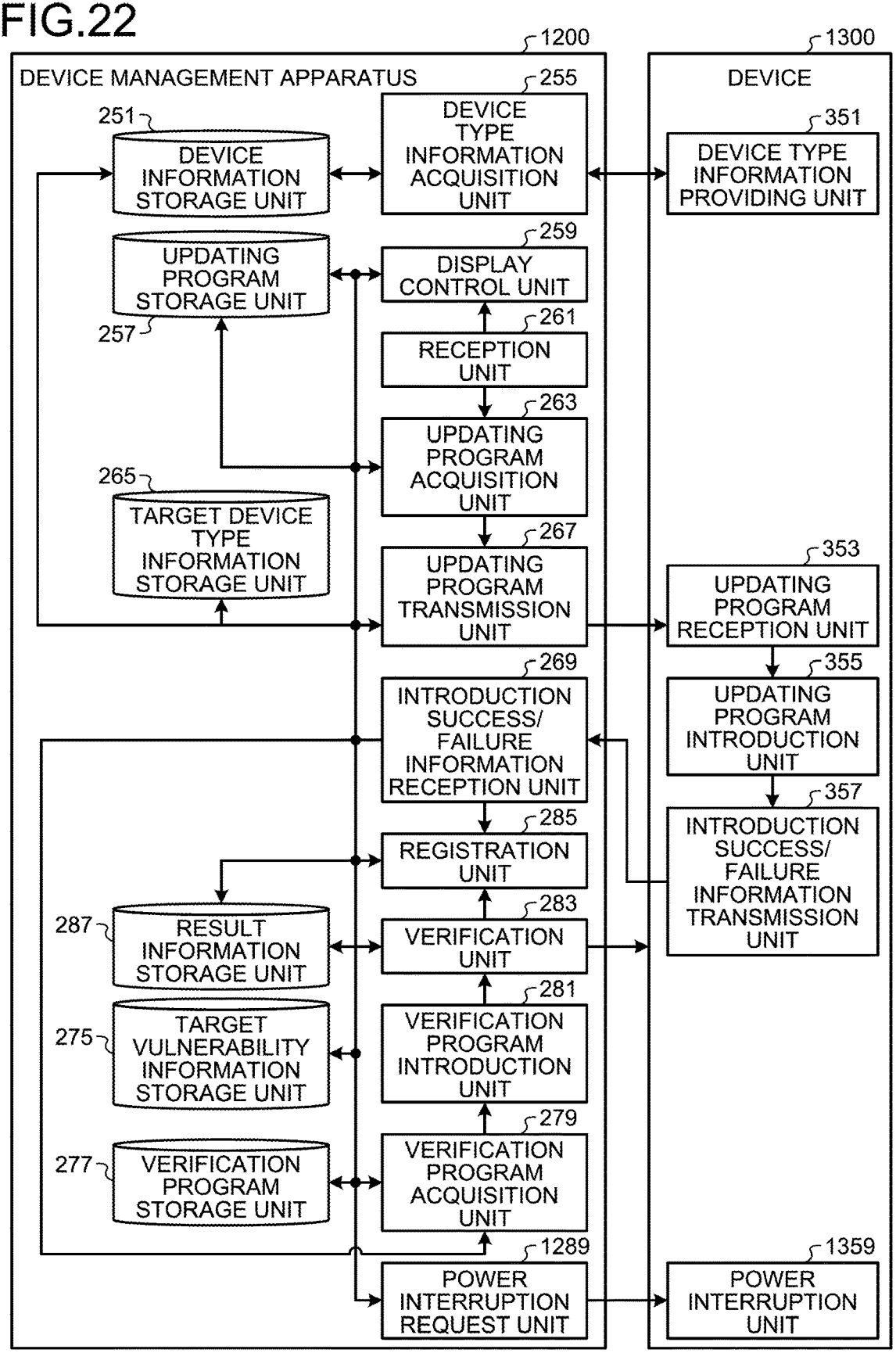
FIG. 22 is a block diagram illustrating an example of a functional configuration of a device management apparatus and a device according to a second embodiment.

FIG. 22 is a block diagram illustrating an example of a functional configuration of a device management apparatus 1200 and a device 1300 according to the second embodiment. As illustrated in FIG. 22, the second embodiment is different from the first embodiment in that the device management apparatus 1200 includes a power interruption request unit 1289 and the device 1300 includes a power interruption unit 1359.

When the introduction success/failure information received by the introduction success/failure information reception unit 269 indicates failure in introduction, the power interruption request unit 1289 requests the device 1300 to interrupt the power supply.

Specifically, the power interruption request unit 1289 acquires, from the result information storage unit 287, the device ID associated with the introduction success/failure information indicating failure in introduction, and acquires the device information including the device ID from the device information storage unit 251.

The power interruption request unit 1289 extracts, from among device IDs stored in the result information storage unit 287, the device ID of the device 300 as a power interruption target, using, for example, the SQL described for the updating program transmission unit 267 according to the first modification.

The power interruption request unit 1289 communicates with the device 1300 indicated by the device ID included in the acquired device information using the IP address included in the device information, and requests the device 1300 to interrupt the power supply. To request interruption of the power supply, a known method may be used such as transmitting a power interruption command depending on the operating system (OS).

When the verification result information indicating the verification result of the verification unit 283 indicates that the operation of the updated device cannot be guaranteed (failure in fixing the vulnerability), the power interruption request unit 1289 requests the device 1300 to interrupt the power supply.

Specifically, the power interruption request unit 1289 acquires the device ID associated with the verification result information indicating failure in fixing from the result information storage unit 287, and acquires the device information including the device ID from the device information storage unit 251.

The power interruption request unit 1289 extracts the device ID of the device 1300 as a power interruption target from among the device IDs stored in the result information storage unit 287, using the SQL as described below, for example.

```
SELECT DISTINCT device ID FROM log table AS L1
WHERE updating program ID = <selected updating program ID>
    AND verification result information = 'NG'
    AND NOT EXISTS (
        SELECT 1 FROM log table AS L2
        WHERE updating program ID = <selected updating program ID>
            AND verification result information = 'NG'
            AND L1. device ID = L2. device ID
            AND L1. vulnerability ID = L2. vulnerability ID
            AND L1. time information < L2. time information
    )
```

The power interruption request unit 1289 communicates with the device 1300 indicated by the device ID included in the acquired device information using the IP address included in the device information, and requests the device 1300 to interrupt the power supply.

When the device management apparatus 1200 requests the power interruption unit 1359 to interrupt the power supply, the power interruption unit 1359 interrupts the power supply of the device 1300 (own device).

Figure 23:
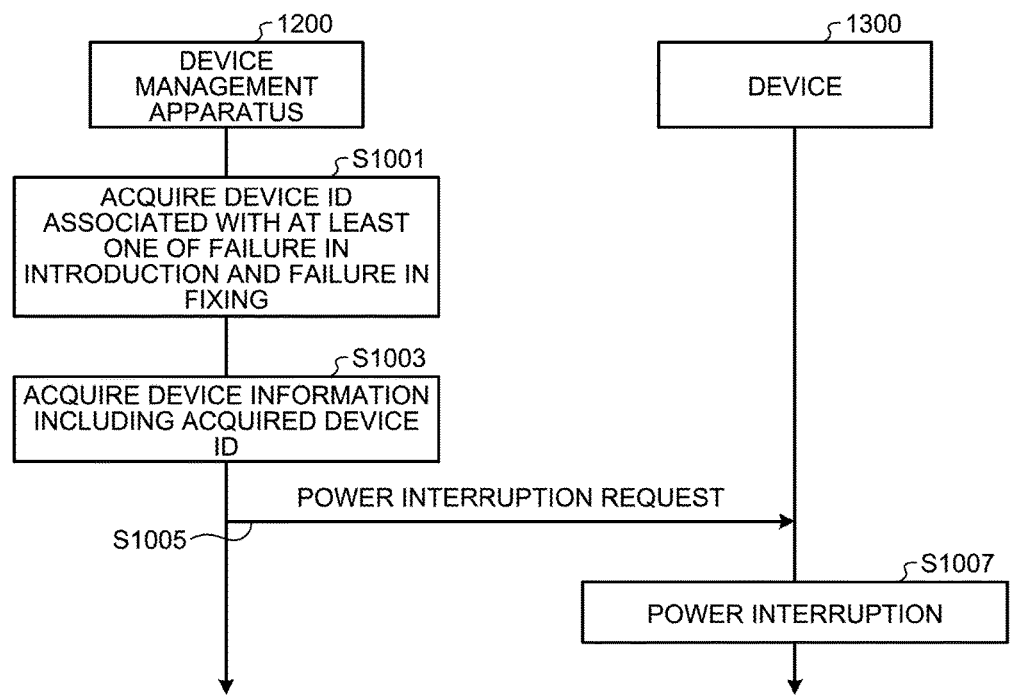
FIG. 23 is a sequence diagram illustrating an example of power interruption processing executed in a device management system according to the second embodiment.

FIG. 23 is a sequence diagram illustrating an example of power interruption processing executed in a device management system 1100 according to the second embodiment.

First, the power interruption request unit 1289 acquires, from the result information storage unit 287, the device ID associated with one of the introduction success/failure information indicating failure in introduction and the verification result information indicating failure in fixing (Step S1001).

Subsequently, the power interruption request unit 1289 acquires the device information including the acquired device ID from the device information storage unit 251 (Step S1003), communicates with the device 1300 indicated by the device ID included in the acquired device information using the IP address included in the device information, and requests the device 1300 to interrupt the power supply (Step S1005).

Subsequently, when the device management apparatus 1200 requests the power interruption unit 1359 to interrupt the power supply, the power interruption unit 1359 interrupts the power supply of the device 1300 (own device) (Step S1007).

The processing at Steps S1005 to S1007 is performed for each piece of device information acquired at Step S1003.

As described above, according to the second embodiment, the power supply can be automatically interrupted in the device 1300 into which the updating program (firmware for fixing the vulnerability) fails to be introduced and the device 1300 the operation of which cannot be guaranteed (the vulnerability is not fixed), so that the device 1300 the security of which cannot be guaranteed can be prevented from being operated.

The second embodiment can be combined not only with the first embodiment but also with the first modification.

Program

The program executed by the device management apparatus and the device according to the embodiments and the modification described above (hereinafter, referred to as "apparatuses according to the embodiments and the modification described above") is recorded and provided in a computer-readable storage medium such as a compact disc read only memory (CD-ROM), a compact disc recordable (CD-R), a memory card, a digital versatile disc (DVD), and a flexible disk (FD) as a file in the installable or executable format.

The program executed by the apparatuses according to the embodiments and the modification described above may be stored in a computer connected to a network such as the Internet and downloaded via the network to provide the program. Furthermore, the program executed by the apparatuses according to the embodiments and the modification described above may be provided or distributed via a network such as the Internet. The program executed by the apparatuses according to the embodiments and the modification described above may be embedded and provided in a ROM, for example.

The program executed by the apparatuses according to the embodiments and the modification described above has a module configuration for implementing the units described above on a computer. As actual hardware, for example, when a CPU reads out the program from a ROM on a RAM and executes the program, each functional part described above is implemented on the computer.

According to an embodiment, it can be determined whether the operation of the device updated with the updating program can be guaranteed.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A device management apparatus comprising:
a memory configured to store a plurality of verification programs, the plurality of verification programs configured to verify whether associated ones of a plurality of vulnerabilities have been successfully patched by an updating program; and
circuitry configured to,
acquire the updating program for updating a device,
transmit the updating program to the device,
receive introduction success/failure information indicating whether the updating program is successfully introduced, from the device,
determine which of the plurality of verification programs is a selected verification program based on which of the plurality of vulnerabilities are patchable by the updating program,
acquire, if the introduction success/failure information indicates success in introduction, the selected verification program, and
verify, using the selected verification program, whether the associated ones of the plurality of vulnerabilities have been successfully patched.

2. The device management apparatus according to claim 1, wherein the circuitry is further configured to reverify, using the selected verification program, whether the associated ones of the plurality of vulnerabilities have been successfully patched, if the associated ones of the plurality of vulnerabilities are present after transmission of the updating program.

3. The device management apparatus according to claim 1, wherein the circuitry is further configured to request the device to interrupt power supply if the associated ones of the plurality of vulnerabilities are present after transmission of the updating program.

4. The device management apparatus according to claim 1, wherein the circuitry is further configured to retransmit the updating program to the device, if the introduction success/failure information indicates failure in introduction.

5. The device management apparatus according to claim 1, wherein the circuitry is configured to request the device to interrupt power supply if the introduction success/failure information indicates failure in introduction.

6. The device management apparatus according to claim 1, wherein the circuitry is configured to register, in the memory, a verification result indicating whether the associated ones of the plurality of vulnerabilities are present after transmission of the updating program.

7. The device management apparatus according to claim 6, wherein the circuitry is further configured to register the introduction success/failure information in the memory.

8. The device management apparatus according to claim 1, wherein the circuitry is configured to verify whether the associated ones of the plurality of vulnerabilities have been successfully patched by pseudo-attacking the device using the selected verification program.

9. A device management system comprising:
a device; and
a device management apparatus, the device management apparatus including,
a memory configured to store a plurality of verification programs, the plurality of verification programs configured to verify whether associated ones of a plurality of vulnerabilities have been successfully patched by an updating program, and
circuitry configured to:
acquire the updating program for updating the device;
transmit the updating program to the device;
receive introduction success/failure information indicating whether the updating program is successfully introduced, from the device;
determine which of the plurality of verification programs is a selected verification program based on which of the plurality of vulnerabilities are patchable by the updating program;
acquire the selected verification program, if the introduction success/failure information indicates success in introduction; and
verify, using the selected verification program, whether the associated ones of the plurality of vulnerabilities have been successfully patched.

10. The device management system according to claim 9, wherein the device includes circuitry configured to,
receive the updating program from the device management apparatus, and
transmit the introduction success/failure information to the device management apparatus.

11. The device management system according to claim 9, wherein the circuitry of the device management apparatus is configured to verify whether the associated ones of the plurality of vulnerabilities have been successfully patched by pseudo-attacking the device using the selected verification program.

12. A verification method method comprising:
acquiring an updating program for updating a device;
transmitting the updating program to the device;
receiving introduction success/failure information indicating whether the updating program is successfully introduced, from the device;
determining which of a plurality of verification programs stored in a memory is a selected verification program based on which of a plurality of vulnerabilities are patchable by the updating program, the plurality of verification programs configured to verify whether associated ones of the plurality of vulnerabilities have been successfully patched by the updating program;
acquiring the selected verification program, if the introduction success/failure information indicates success in introduction; and
verifying, using the selected verification program, whether the associated ones of the plurality of vulnerabilities have been successfully patched.

13. The verification method according to claim 12, further comprising:
   receiving, by the device, the updating program; and
   transmitting, by the device, the introduction success/ failure information.

14. The verification method to claim 12, wherein the verifying comprises:
   pseudo-attacking the device using the selected verification program.

\* \* \* \* \*